Sept. 28, 1965   J. PETERS   3,208,798
SAFETY WHEEL
Filed April 24, 1964   2 Sheets-Sheet 1

INVENTOR.
JOHN PETERS,
BY
McMorrow, Berman & Davidson
ATTORNEYS.

Sept. 28, 1965  J. PETERS  3,208,798
SAFETY WHEEL
Filed April 24, 1964  2 Sheets-Sheet 2
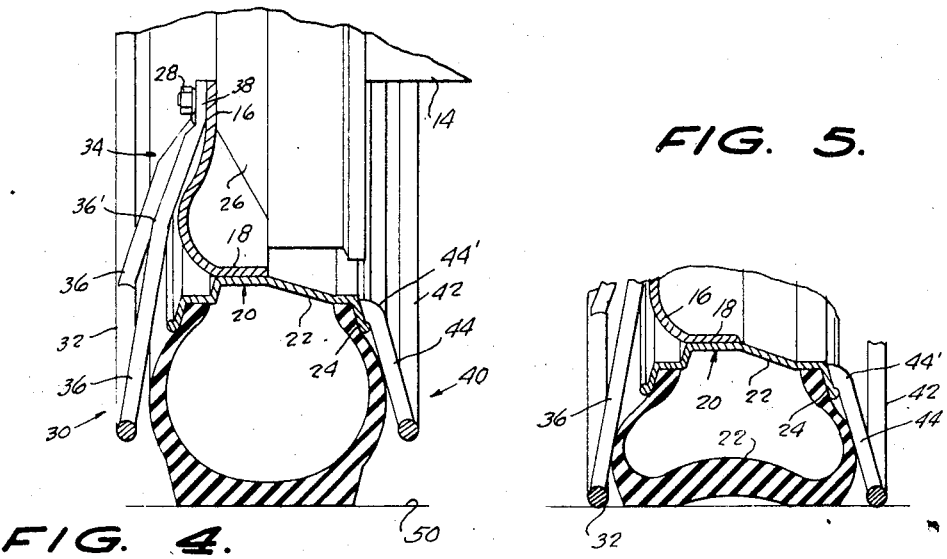
FIG. 4.  FIG. 5.
FIG. 6.
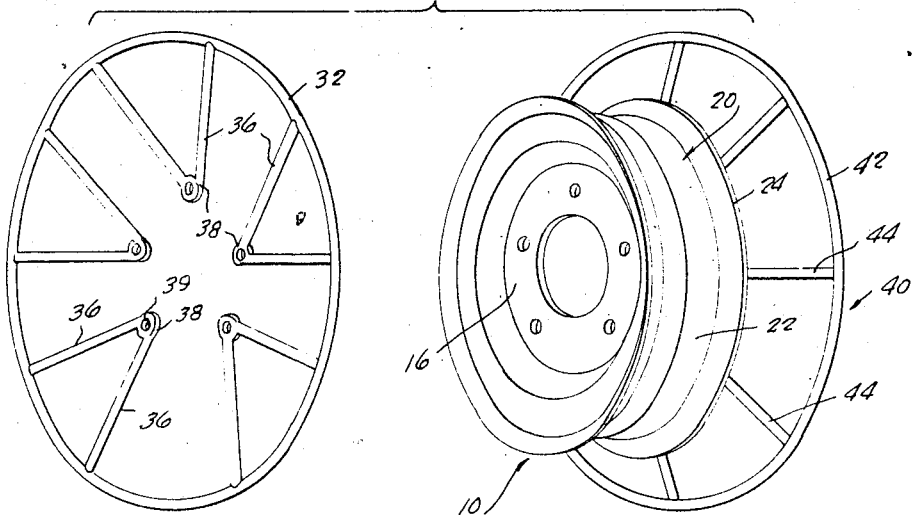
INVENTOR.
JOHN PETERS,
BY
McMorrow, Berman & Davidson
ATTORNEYS.

United States Patent Office 3,208,798
Patented Sept. 28, 1965

3,208,798
SAFETY WHEEL
John Peters, 4852 S. Michigan Ave., Chicago, Ill.
Filed Apr. 24, 1964, Ser. No. 362,236
1 Claim. (Cl. 301—38)

This invention relates to safety means adaptable for use in connection with vehicle wheels equipped with pneumatic tires and, more specifically, the invention pertains to safety means which becomes operable upon the collapse of a tire occasioned by a puncture or blow-out to insure the continued and safe operation of the vehicle thereafter.

It is common knowledge that countless automobile accidents have been brought about through the puncturing or blow-out of pneumatic tires, especially when the vehicle is traveling at high speeds, and such accidents not infrequently are the direct cause of death. It is, therefore, one of the primary objects of this invention to provide safety means in the nature of a safety wheel to prevent the automotive vehicle from going out of the control of the operator and thus decrease the possibilities of accidents as a consequence of a puncture or a blow-out.

A further object of this invention is to provide a safety means for conventional automobile wheels, the safety means being specifically designed to prevent the dropping or settling of an automobile wheel upon the puncture or blow-out thereof and thereby provide to the operator means for preventing his loss of control of the vehicle.

A further object of this invention is to provide a safety means for use in conjunction with conventional automobile wheels, the automobile wheels having diameters less than the safety means which are mounted thereon and wherein the safety means each has a diameter less than the outside diameter of the pneumatic tires carried by the automobile wheels. Thus, each safety means will contact the roadway over which the vehicle is traveling when one or more of the tires of the vehicle are deflated, whereby the driver maintains full control over the vehicle in bringing the same to a stop.

This invention contemplates, as a still further object thereof, the provision of an automobile vehicle safety means which is non-complex in construction and assembly, inexpensive to manufacture and maintain, and which is durable in use.

Other and further objects and advantages of the instant invention will become more evident from a consideration of the following specification when read in conjunction with the annexed drawings, in which:

FIGURE 4 is an enlarged fragmentary detail cross-sectional view, FIGURE 4 being taken substantially on the vertical plane of line 4—4 of FIGURE 1, looking in the direction of the arrows, FIGURE 4 showing the relationship of the safety means with the tire in its inflated condition;

FIGURE 5 is a fragmentary detail cross-sectional view similar to FIGURE 4, but showing the safety means in its operative position with the pneumatic tire deflated; and FIGURE 6 is an exploded perspective view of a conventional vehicle wheel together with the safety means according to this invention.

Figure 1:
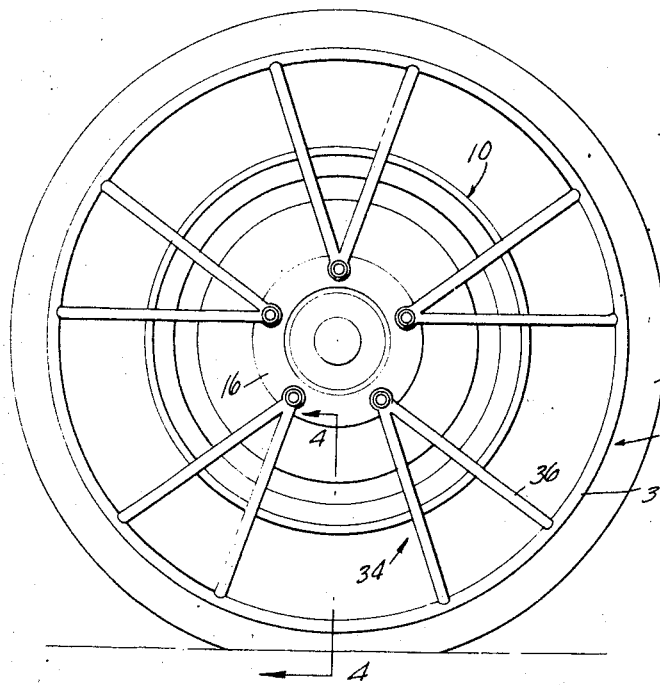
FIGURE 1 is an outside side elevational view of a vehicle means equipped with a safety wheel constructed in accordance with this invention.
Figure 2:
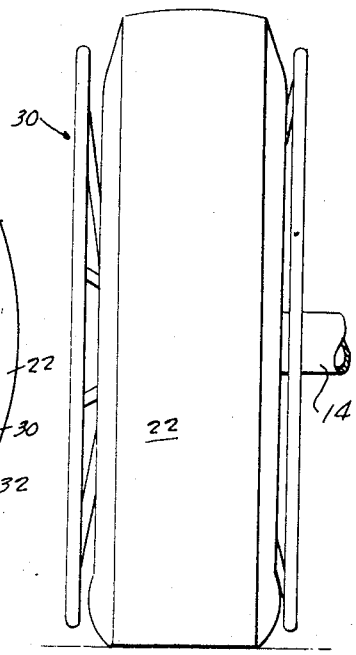
FIGURE 2 is a front elevational view of a vehicle wheel equipped with a safety means.
Figure 3:
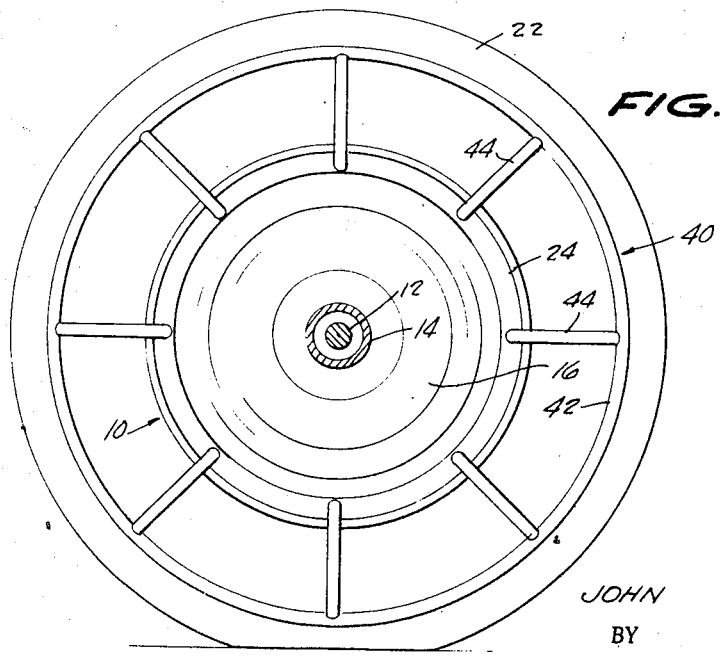
FIGURE 3 is an inner side elevational view of a vehicle wheel equipped with a safety means.

Referring now more specifically to the drawings, reference numeral 10 designates, in general, a conventional vehicle wheel constructed in accordance with present-day techniques. The wheel 10 is adapted for rotation on one end of an axle 12 which extends through an axle housing 14 in the usual manner. The wheel 10, at the outer side thereof, includes a wheel disc 16 which terminates adjacent its outermost peripheral marginal edge in a laterally and inwardly-extending flange 18. The flange 18 is substantially cylindrical and has fixedly secured thereon a substantially cylindrical tire rim 20 having a channel-shaped cross-sectional configuration.

The tire rim 20 includes a drop center flange 22 from the inner side of which laterally and outwardly-projects a tire bead retaining flange 24. The wheel disc 16 is adapted for connection to a brake drum 26 as by the bolts 28.

The safety means to which this invention is specifically directed includes two component elements 30 and 40, respectively. The component 30 is adapted for connection to the exterior side of the wheel 10 and is seen to comprise a wheel 32 having a substantially cylindrical transverse cross-sectional configuration. The wheel 32 is formed of any substantially solid rigid material, for example, steel. The wheel 32 is detachably connected to the wheel disc 16 by means of a plurality of substantially V-shaped connectors 34. As is seen in FIGURES 1, 4 and 6, each connector 34 comprises a pair of arms 36 having one of their respective ends connected to the wheel 32 with the inner ends thereof converging inwardly toward one another where they are integrally joined at the apex of the connector in a boss 38. Each of the bosses is provided with a transversely-extending opening 39 to receive the bolts 28 therethrough, whereby the component 30 is fixedly secured to the wheel disc 16 for rotation therewith.

The second component 40 of the safety wheel comprises an annular member 42 also having a substantially cylindrical transverse cross-sectional configuration, the annular member 42 being formed, as before, of steel or any other desirable rigid material. The annular member 42 is fixedly secured to the tire bead retaining flange 24 of the rim 20 by means of a plurality of elongated, substantially cylindrical struts 44. As seen in FIGURE 4, the struts 44 have one of their respective ends fixedly secured to the tire bead retaining flange 24 and the other ends thereof radiate therefrom for rigid connection with the annular member 42.

Depending upon the vehicle wheel construction, it may be necessary that the arms 36 be bent, as at 36', and the bosses 38 at the apex ends of the connector members 34 be somewhat offset with respect to the longitudinal axes of the arms 36' in order that the wheel 32 be disposed proximate to, but spaced from the adjacent side of the tire 22. To accomplish the same purpose, the struts 44 may be bent at 44' in order that the annular member 42 be disposed adjacent to, but spaced from the adjacent side of the tire 22 at the inner side thereof.

As is seen in FIGURES 1, 2, 3 and 4, the wheel and annular member 32, 42 are concentrically-disposed relative to the wheel 10 and are preferably so constructed that the lowermost points thereof are equally spaced above the ground line 50. It should also be noted that when the tire 22 is in its inflated condition, as illustrated in FIGURE 4, the spacing between the wheel and annular member 32, 42, and the ground line 50 is such as to permit the tire 22 to flex when encountering obstacles without causing engagement of the wheel and annular member 32, 42 with the ground.

Assuming that the vehicle upon which the wheel 10 is mounted is in operation and the tire 22 associated therewith is inflated, as shown in FIGURE 4, the driver, during the operation of the vehicle, will have full control thereover. However, if, for some reason, and during the operation of the vehicle, the tire 22 becomes deflated to assume the position shown in FIGURE 5, the wheel 10 will drop and will cause the wheel and annular member 32, 42 to engage against the ground 50. The wheel 10 thus becomes supported on the wheel and annular member 32, 42 to prevent the maximum drop of the wheel 10 had the wheel and annular member 32, 42 not been present. Additionally, the connectors 36, wheel 32, struts 44 and annular member 42 may be said to surround or straddle the tire 22 when collapsed, as shown in FIGURE 5, and confines the same therebetween to effectively prevent the tire 22 from slipping transversely of the rim 20, thereby enhancing the control of the driver over the vehicle, as well as preventing massive damage to the tire 22.

Whenever it becomes necessary to change the wheel 10 or tire 22, all that is necessary is to disconnect the bolts 28 from the brake drum 26, thereby freeing the wheel 32 from the wheel disc 16 which may then be removed from the drum 26. The wheel disc 16 and rim 20 are removed thereafter in the usual manner, the element 40, however, remaining as an integral part of the tire bead retaining flange 24.

Re-assembly of the wheel 10 on the drum 26 is accomplished through exactly the same steps referred to immediately above, but in the reverse order.

Having described and illustrated one embodiment of this invention in detail, it will be understood that the same is offered merely by way of example, and that this invention is to be limited only by the scope of the appended claim.

What is claimed is:

In combination with a vehicle wheel having a wheel disc and a cylindrical tire rim secured thereto concentric therewith, said rim including a drop center flange having a tire bead retaining flange projecting laterally therefrom, a safety means comprising two component elements, one of said elements including a plurality of independent substantially V-shaped connectors each having an apex adapted for detachable connection with said wheel disc, said connectors each having arms diverging away from its respective apex and extending beyond said rim, a wheel disposed on one side of said rim, means fixedly connecting the outer ends of said diverging arms with said wheel, means detachably connecting said connectors with said wheel disc to hold said wheel concentric with but outwardly-spaced from said rim, and the second element of said safety means comprising an annular member, said annular member being disposed on the other side of said rim, and means fixedly securing said annular member to said other side of said rim in outwardly-spaced concentric relation relative thereto, said wheel and annular member being aligned and coincident with one another, said means fixedly securing the annular member to the other side of said rim comprising a plurality of struts having one of their respective arms fixedly secured to said tire bead retaining flange projecting from said drop center flange, and the other of each of said struts being fixedly connected with said annular member, each of said V-shaped connectors being provided with a centrally-apertured boss at the apex thereof to receive fastening means therethrough, said arms of said V-shaped connectors, said struts, and said wheel and annular members being all substantially cylindrical in transverse cross-section.

References Cited by the Examiner

UNITED STATES PATENTS

| 1,589,990 | 6/26 | Seldomridge | 301—39 |
| 2,233,742 | 3/41 | Lowry | 301—39 |
| 2,354,444 | 7/44 | Lyon | 301—38 |

FOREIGN PATENTS

| 694,269 | 9/30 | France. |
| 1,125,138 | 7/56 | France. |

BENJAMIN HERSH, *Primary Examiner.*

ARTHUR L. LA POINT, *Examiner.*